United States Patent [19]

Geiger

[11] Patent Number: 5,287,888
[45] Date of Patent: Feb. 22, 1994

[54] IRRIGATION CONTROLLER

[76] Inventor: James E. Geiger, 1848 Germaine Dr., Yuba City, Calif. 95993

[21] Appl. No.: 4,949

[22] Filed: Jan. 15, 1993

[51] Int. Cl.$^5$ ............................................. G05B 11/01
[52] U.S. Cl. ................................... 137/624.2; 239/70
[58] Field of Search ................. 137/624.2; 239/69, 70

[56] References Cited

U.S. PATENT DOCUMENTS

| | | |
|---|---|---|
| 3,273,593 | 9/1966 | Kinsley . |
| 3,989,066 | 11/1976 | Sturman et al. . |
| 4,092,505 | 5/1978 | Caviar . |
| 4,165,532 | 8/1979 | Kendall et al. ............... 137/624.2 X |
| 4,209,131 | 6/1980 | Barash et al. . |
| 4,232,707 | 11/1980 | Sturman et al. ................... 137/624.2 |
| 4,244,022 | 1/1981 | Kendall . |
| 4,270,573 | 6/1981 | Sturman et al. . |
| 4,304,989 | 12/1981 | Vos et al. . |
| 4,333,490 | 6/1982 | Enter, Sr. . |
| 4,661,719 | 4/1987 | Burchfiel et al. . |
| 4,827,155 | 5/1989 | Firebaugh ..................... 137/624.2 X |

OTHER PUBLICATIONS

Advertisement from Landscape and Irrigation Magazine; "Switch-Hitter"; May 1988.
Irrigation Maintenance Bulletin-National Irrigation Specialists; "Switch-Hitter"; date of publication unknown.

Primary Examiner—Gerald A. Michalsky
Attorney, Agent, or Firm—John P. O'Banion

[57] ABSTRACT

A device for expanding the number of stations controlled by an existing irrigation controller or the like, or which can be operated as a stand-alone irrigation controller. The device (10) includes a control processor (12) which sequentially activates one or more control lines (66) for a predetermined period of time, the time periods being independently set for each control line. The timing cycle of the device (10) can be initiated manually or from a station control line (60) of an existing master controller (50). Activation by a master controller occurs after the station control line to which the device is connected completes its timed cycle according to the master controller. One or more of the devices can be cascaded to provide unlimited expansion capability.

13 Claims, 6 Drawing Sheets

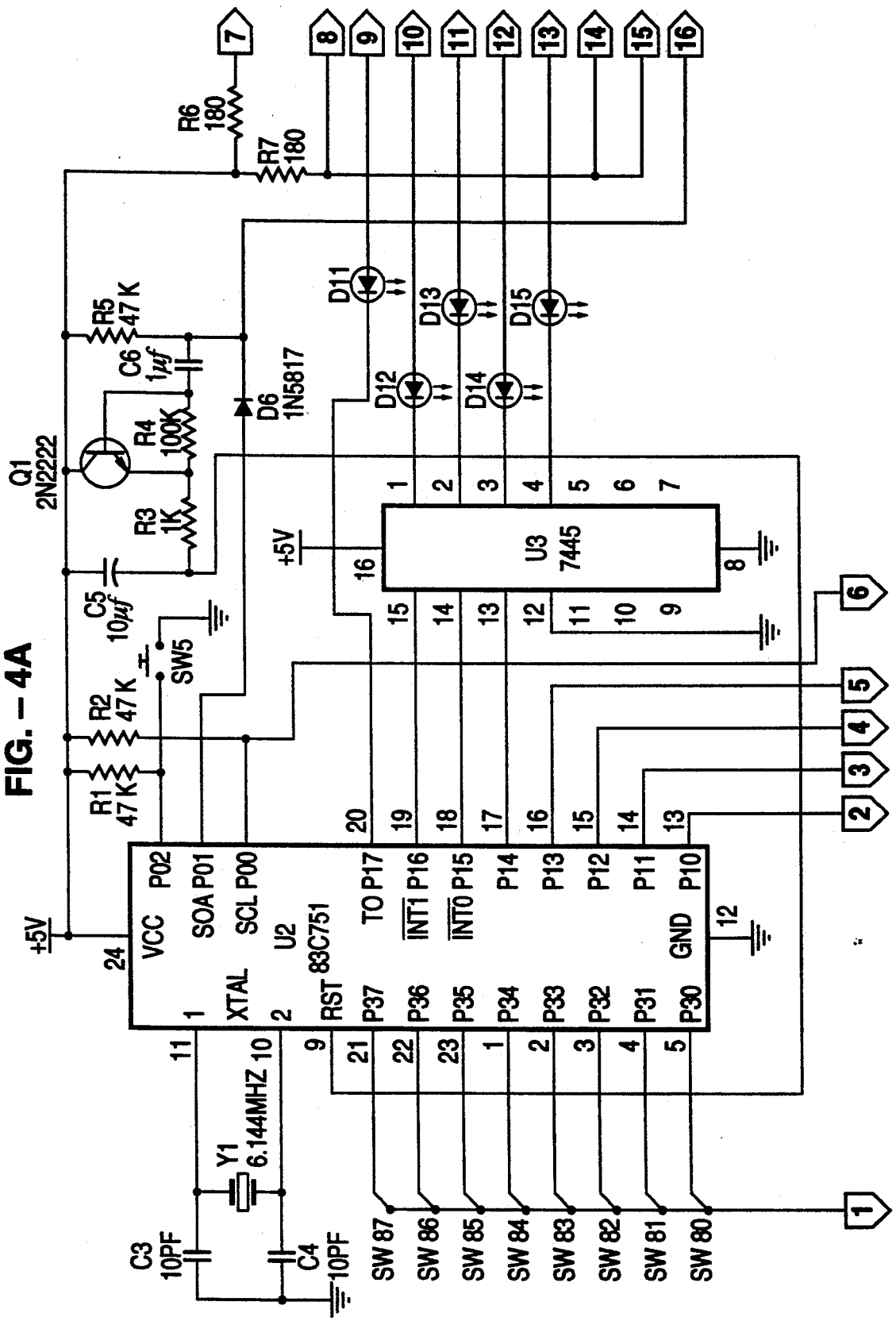
FIG. —4A

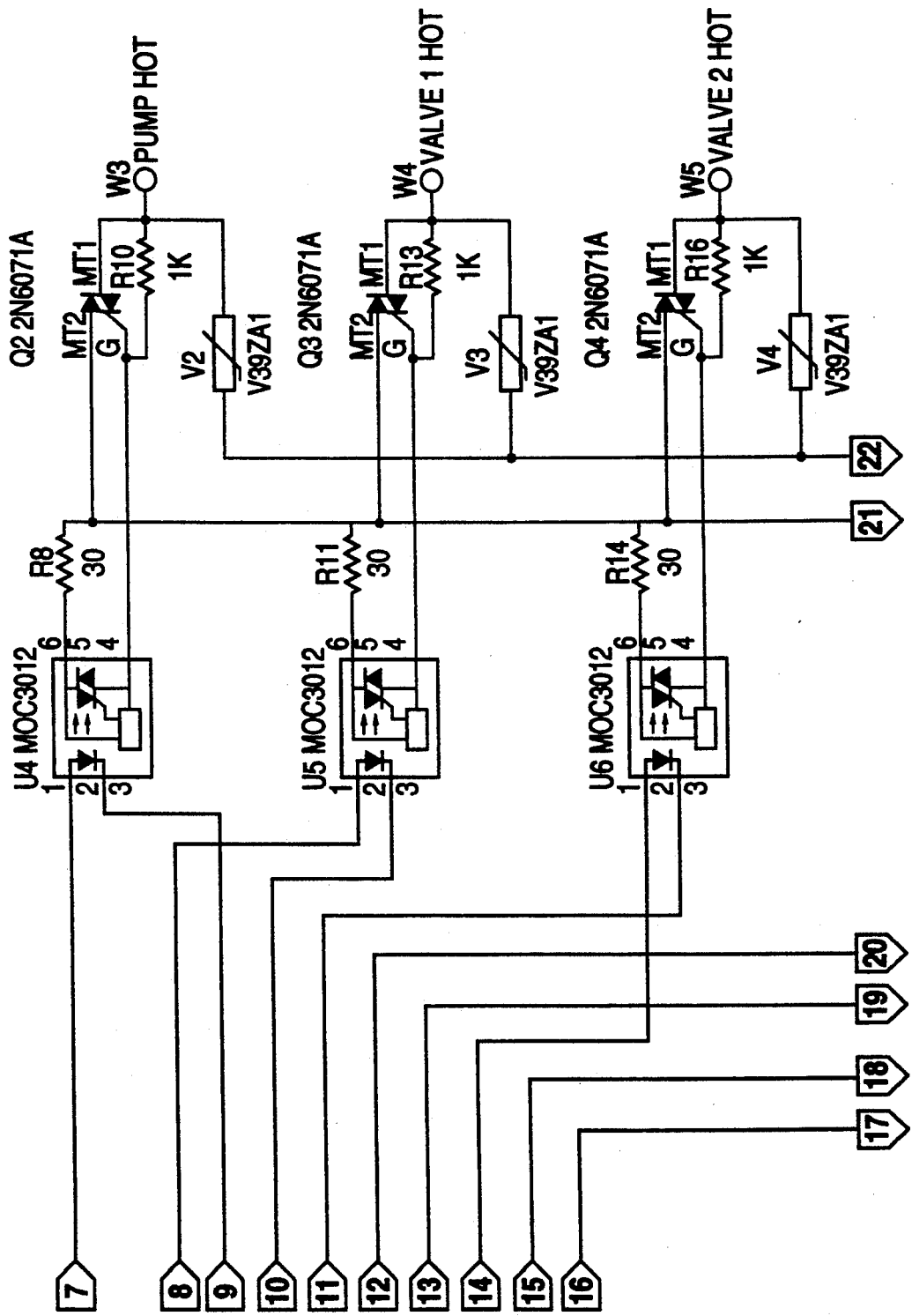
FIG. — 4B

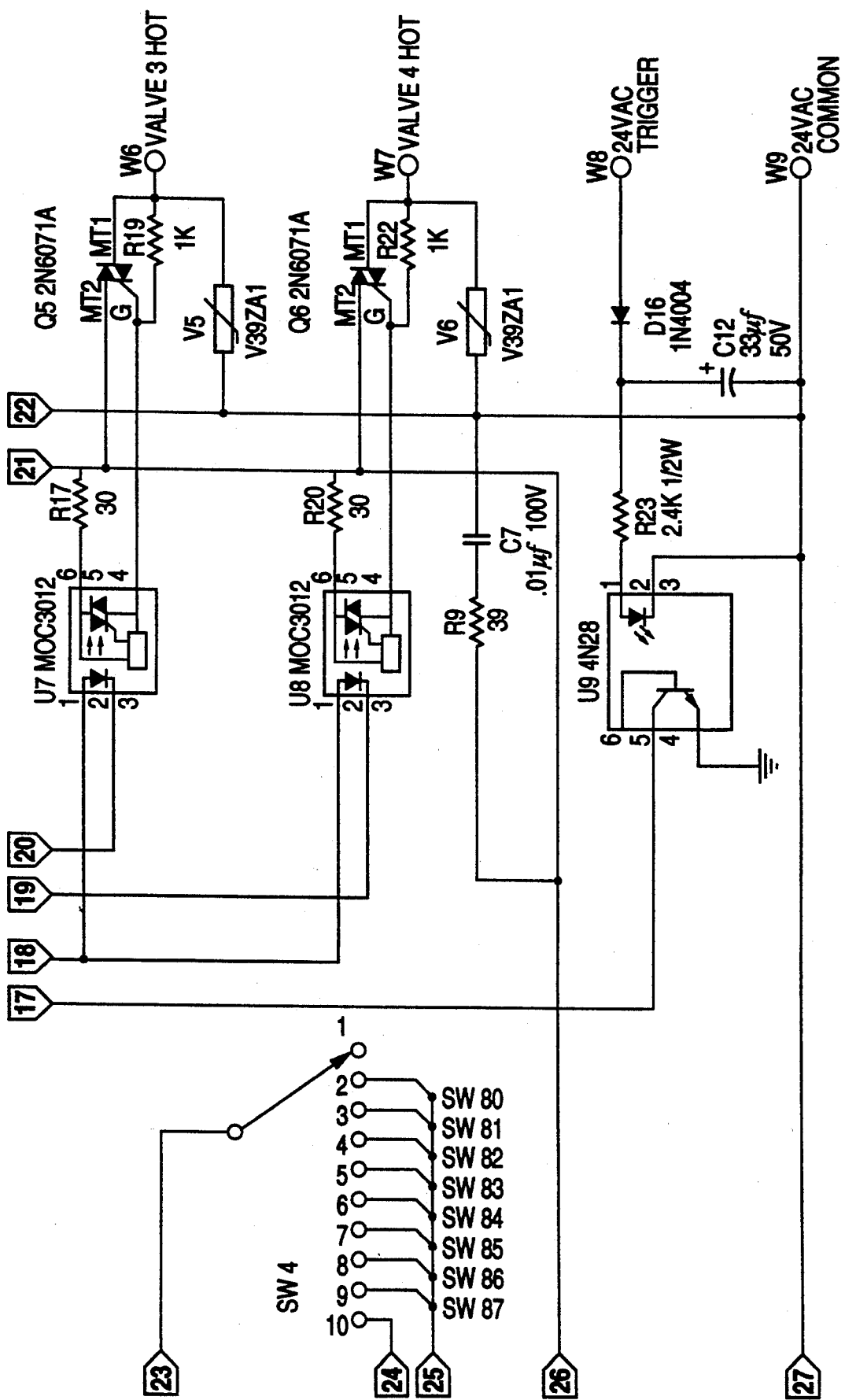
FIG. —4D

IRRIGATION CONTROLLER

BACKGROUND OF THE INVENTION

1. Field of the Invention

This invention pertains generally to irrigation controllers and more particularly to an apparatus for expanding the number of timed stations which can be controlled from a single master control unit.

2. Description of the Background Art

Conventional timer operated irrigation controllers are manufactured with a fixed number of stations, each of which sequentially operates an electric solenoid valve to permit the flow of water to an area to be irrigated. In the event that more stations are required, a conventional controller cannot be expanded and, therefore, must be replaced with a larger unit. And, where very large areas are to be irrigated, it is typically impractical to manufacture a controller with a sufficient number of stations to provide for complete coverage. Therefore, in those instances it is common to utilize multiple controllers or a master/slave system where the master controller operates one or more slave units, but does not directly operate any valves. One such example can be found in the U.S. Pat. No. 4,244,022 issued to Kendall on Jan. 6, 1981. While a system such as this can be expanded by adding more slave units, up to a fixed number, when that limit is reached, further expansion is not possible since the slave units themselves cannot be expanded.

Various devices heretofore developed have certain limited capabilities for expanding the number of stations which can be controlled from a single station control line. For example, U.S. Pat. No. 4,661,719 issued to Burchfiel et al. on Apr. 28, 1987 discloses an auxiliary switching circuit which can be used to restore control functions in the event of a broken control line. The device is coupled to the master controller side of the broken control line and, drawing its power from the control line, is activated by the master controller during the time period that the valve connected to the broken control line would have been operated. One or more valves can be operated by the device, which includes internal control and clocking circuitry. However, because the device is powered by the control line from the master controller, it can only operate for a total period of time which does not exceed the station operation time set in the master controller. In many instances, this is limited to one hour. Furthermore, because of this limitation, it is not possible to cascade additional units for unlimited expansion of the system. And, if the control line is again broken or the master controller loses power, the device will become non-operational.

Therefore, a need exists for a device which can provide for expansion of an existing irrigation controller and provide for virtually unlimited expansion of the existing system. There is further a need for a device which can provide for timed control of the irrigation system even when the master controller is non-operational. The present invention satisfies that need and overcomes the deficiencies found in the devices heretofore developed.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention generally pertains to an apparatus for expanding the number of irrigation valves (stations) which can be operated from an existing controller. By way of example and not of limitation, the apparatus includes a control processor around which its operation is based. The control processor includes a plurality of outputs which are coupled to line drivers (valve drivers), each of which is adapted for activating an irrigation valve or similar device. When the control processor is activated, each valve driver is sequentially operated for a predetermined period of time which is selected by the user. In this manner, a plurality of irrigation valves can be sequentially operated on independently timed cycles. An additional line driver (pump driver) is provided for operation of a pump or the like. The pump driver is operated at any time a valve driver is operated. In this manner, the apparatus can control an irrigation pump which may be required to supply water to flow through the valves. When the last valve driver has completed its timed cycle, the pump driver is also deactivated.

As a timing control means, a plurality of switches are provided for the user to select the length of operation of each valve driver. The switches select program states in the control processor corresponding to predetermined time periods. In the preferred embodiment, each valve driver can be set to off, to operate for 1, 5, 10, 15, 20 or 30 minutes, or to operate for 1, 2 or 4 hours, thereby providing considerable flexibility in selecting optimum irrigation cycles. In addition, light emitting diodes are employed to provide visual indication of the operation of each line driver.

Activation of the apparatus can be from either of two inputs. A push button switch is provided for manual operation of the apparatus. By depressing and releasing the switch, the apparatus will begin the irrigation cycle. Once the cycle begins, subsequent operation of the push button will cause the apparatus to sequentially step to the next valve driver, thereby deactivating the valve driver which is in current operation. Therefore, the user can initiate a full irrigation cycle, or manually bypass one or more sequential valve drivers in the cycle. For example, where four valve drivers are employed, the user can step past the first two valve drivers and operate only the last two valve drivers. A similar result could be achieved by setting the timer control for the first two valve drivers to "off" and initiating a full cycle.

Alternatively, and more significantly, the apparatus can be operated from an existing irrigation controller (master controller) and would be installed adjacent to the master controller. An input port is provided for signaling operation of the apparatus from a station control line of a master controller. By connecting the input port to the master controller, the capability of the master controller can be expanded by the number of valve drivers provided by the apparatus of the present invention.

Furthermore, the input port of the apparatus can be connected to either a used or unused station control line in the master controller. This is the result of a significant aspect of the present invention. Whenever the master controller activates the station control line coupled to the input port of the apparatus, a 24 V ac signal will be present. If a device such as shown in U.S. Pat. No. 4,661,719 were used to provide for additional station capability, because the patented unit is powered by that 24 V ac signal, the overall timing cycle would be limited to that of the particular station control line in the master controller. In the present invention, however, the control process is "armed" upon application of the 24 V ac signal, but the timing cycle is not initiated until the signal is removed. Therefore, the overall timing cycle of the present invention is independent of the master controller. In addition, several units of the present invention can be cascaded to provide virtually an unlimited expansion capability. And, the present invention will not reduce the number of irrigation valves which can be directly operated from the master controller even though it is coupled to a station control line in the master controller.

An object of the invention is to expand the number of stations on an existing irrigation controller.

Another object of the invention is to expand the number of stations on an existing irrigation controller without dedication of a station to operation of the invention.

Another object of the invention is to provide for cascading a plurality of units of the invention for virtually unlimited expansion capability.

Another object of the invention is to provide a an irrigation controller with dual capability to be activated from an existing controller or be manually activated.

Another object of the invention is to provide for optimum selection of irrigation periods.

Another object of the invention is to expand the number of stations assigned to each program of a controller having multiple programs.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 4A through FIG. 4D is a schematic diagram of one embodiment of the apparatus shown in FIG. 1.

DESCRIPTION OF THE PREFERRED EMBODIMENTS

Figure 1:
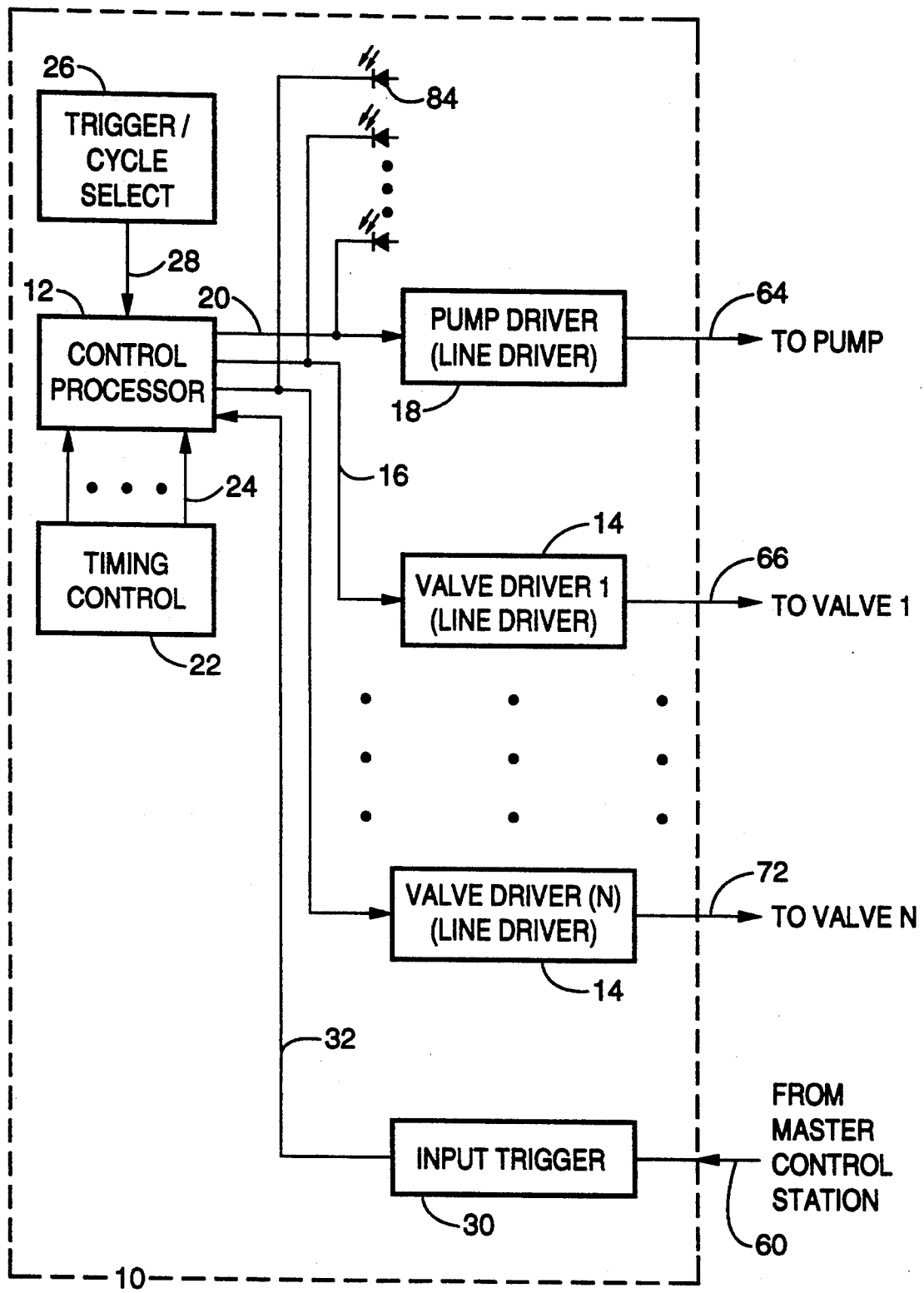
FIG. 1 is a functional block diagram of the present invention.

Referring more specifically to the drawings, for illustrative purposes the present invention is embodied in the apparatus functionally shown in the block diagram of FIG. 1 and schematically shown in the circuitry of FIG. 4A through FIG. 4D. It will be appreciated that the apparatus may vary as to configuration and as to details of the functional elements, circuitry, and components without departing from the basic concepts as disclosed herein.

Referring to FIG. 1, the present invention generally comprises an auxiliary controller 10 for use in operating irrigation pumps, valves and the like. Control processor means 12, which is an 83C751 or equivalent with an on-board clock, is programmed to sequentially select and activate a plurality of line or valve driver means 14 through a plurality of interconnections 16. Each valve driver means 14 remains active for a predetermined period of time selected by the user, but no two valve driver means 14 are active at the same time. Assuming that there are four valve driver means 14, for illustrative purposes individual valve driver means will be described by using the subscript n, where n is an incrementing counter. For $n=1$, the corresponding valve driver means $14_n$ is activated for a predetermined period of time. That valve driver means is then deactivated, and counter n is incremented to $n=n+1$. The corresponding valve driver means $14_n$ is then activated and deactivated as before. The process continues until each valve driver means has been activated and deactivated in sequence, whereupon the cycle ends. In addition, a non-timed line or pump driver means 18, which is coupled to control processor means 12 through interconnection 20, is provided for use in conjunction with irrigation systems which require a pump to be operated during operation of a valve. Pump driver means 18 is activated by control processor means 12 at all times where a valve driver means 14 is activated. In this manner, a pump or the like can be operated to provide water to the controlled valves. Valve driver means 14, as well as pump driver means 18, typically comprises an opto-isolated triac such as an MOC3012 or equivalent coupled to a power triac such as a 2N6071A protected by an MOV such as a V39ZA1 or equivalent, and provides a 24 V ac valve control signal (or pump control signal) with sufficient current to control a solenoid operated valve or pump control.

Timing control means 22 permits the user to determine the time period over which each of the valve driver means 14 will remain active. Timing control means 22, which typically comprises a plurality of ten position rotary switches coupled to control processor means 12 through a plurality of interconnections 24, preferably provides for each valve driver means to be set to off, to operate for 1, 5, 10, 15, 20 or 30 minutes, or to operate for 1, 2 or 4 hours. Note also that, by use of a plurality of multi-position switches for timing control means 22, each valve driver means can be set to operate for a different period of time, thereby providing the user with considerable flexibility in setting desired irrigation cycles.

Operation of auxiliary controller 10 can be initiated in either of two ways.

Trigger/cycle select means 26, which generally comprises a push button switch, is coupled to control processor means 12 through interconnection 28 to provide for manual control of the apparatus and for advancing through the sequence. Operation of trigger/cycle select means 26 by the user will initiate the sequential cycle. Once the cycle begins, subsequent operation of trigger/cycle select means 26 will instruct control processor means 12 to deactivate the valve driver means 14 in current operation, and to step to the next valve driver means 14 in the sequence.

Input trigger means 30, which is coupled to control processor means 12 through interconnection 32, provides for external control of the apparatus and is configured and structured for coupling to a 24 V ac station control line from a master controller. When the master controller activates the corresponding station control line, a 24 V ac input control signal will be applied to input trigger means 30. Input trigger means 30 senses the input control signal and "arms" control processor means 12. At this point, however, the sequential cycle is not initiated. Control processor means 12 remains armed until the 24 V ac signal is removed from input trigger means 30, at which point input trigger means 30 will "trigger" control processor means 12 and the sequential cycle will begin. In other words, the timing cycle is initiated by an "on/off" transition of a 24 V ac input control signal coupled to input trigger means 30. Preferably input trigger means 30 comprises an optically isolated switch such as a 4N28 or equivalent.

The apparatus generally requires a 24 V ac source of power for operation. Such power can be supplied by means of a transformer coupled to a higher voltage supply or, when the apparatus is used in conjunction with a master controller, from the 24 V ac source of power which is normally supplied to the master controller for operation. In addition, a plurality of display means 84, which are typically light emitting diodes, can be employed to provide visual indication that a particular valve driver means or the pump driver means is active.

Figure 2:
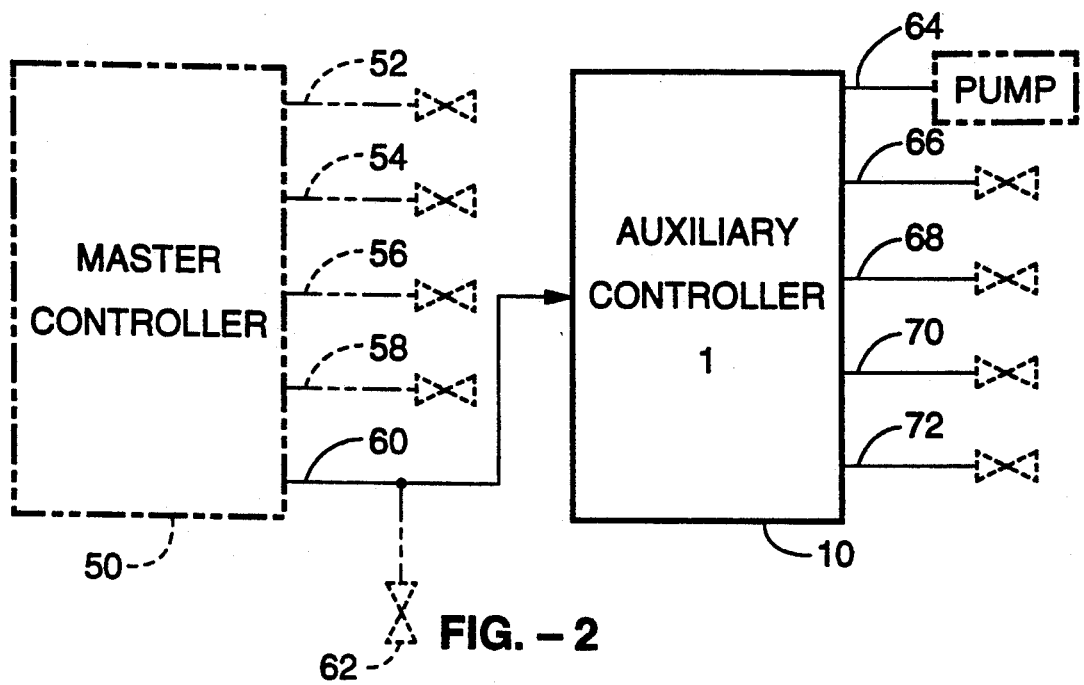
FIG. 2 is a system block diagram showing a typical configuration of the present invention coupled to a master controller, pump, and valves shown in phantom.

FIG. 2 shows a typical configuration where auxiliary controller 10 is coupled to a station control line 60 on master controller 50. In this configuration, station control line 60 would be connected to input trigger means 30 (see FIG. 1) on auxiliary controller 10. Master controller 50 would typically activate station control lines 52, 54, 56, 58 in sequence, and then activate station control line 60 (which may also be coupled to valve 62 without affecting operation of auxiliary controller 10) by outputting a 24 V ac signal on the control line for a predetermined period of time. Control processor means 12 will be armed when station control line 60 is activated. Once the predetermined period of time has elapsed, master controller 50 turns off the 24 V ac signal on station control line 60. At that point in time, auxiliary controller 10 is triggered and valve control lines 66, 68, 70, 72 are activated in sequence by outputting a 24 V ac signal on the control line for a predetermined period of time. In this manner, the number of timed stations has been expanded. Pump control line 64 would also operate when valve control lines 66, 68, 70, 72 operate.

Figure 3:
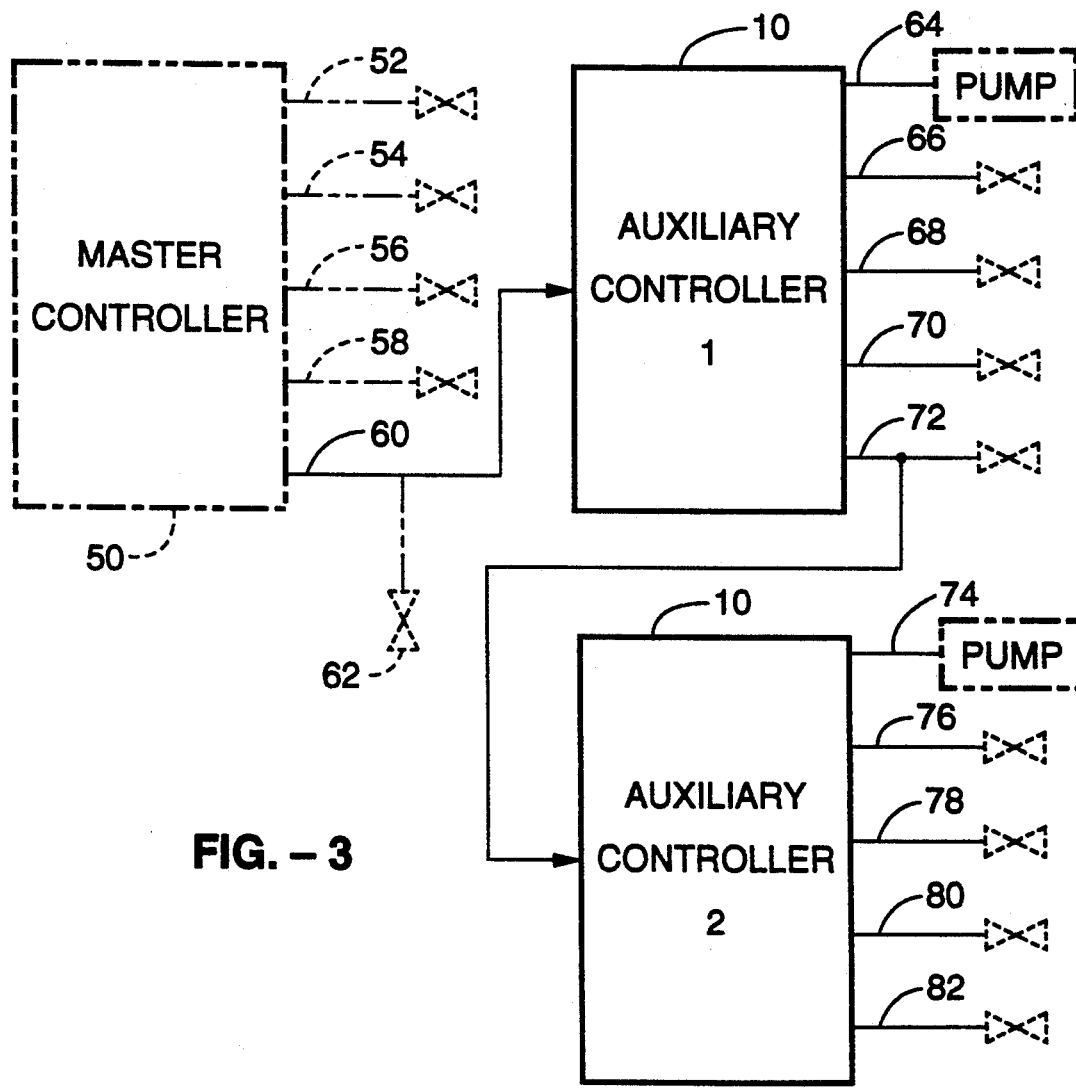
FIG. 3 is a system block diagram showing the configuration of FIG. 2 expanded to include plural units of the present invention coupled to a master controller, pump, and valves shown in phantom.
Figure 4C:
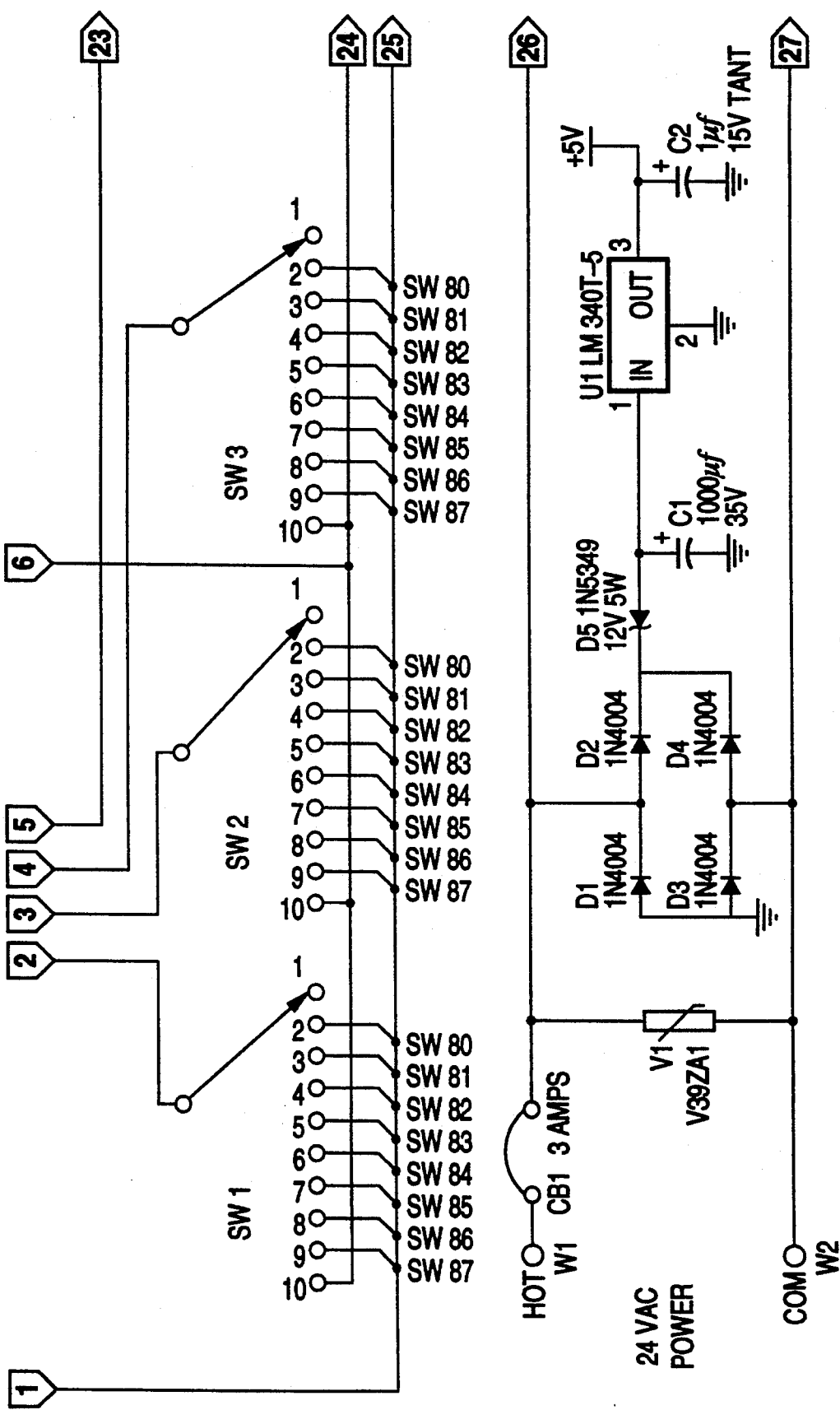

Referring also to FIG. 3, where like reference numerals are used to designate like configuration, the virtually unlimited expansion capability of the present invention can be more clearly seen. A plurality of auxiliary controllers 10 can be cascaded as shown by coupling a valve control line (e.g, valve control line 72) to input trigger means 30 of another unit. This configuration can be repeated for any number of auxiliary controllers 10.

FIG. 4 is a schematic diagram showing the preferred embodiment of circuitry and circuit elements employed in the present invention. Those skilled in the art, however, will appreciate that equivalent circuitry could be employed, circuit elements could be substituted with equivalent elements, and analog or digital equivalents could be employed.

Accordingly, it will be seen that this invention provides for flexible control of irrigation valves and the like, as well as virtually unlimited expansion of the number of stations which can be controlled from a master controller. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. An irrigation control apparatus, comprising:
   (a) a plurality of valve driver means for generating valve control signals to activate irrigation valves;
   (b) control processor means for sequentially activating each of said valve driver means for a predetermined period of time; and
   (c) input trigger means for sensing an input control signal from a station control line of a master controller and initiating said sequential activation of said valve driver means by said control processor means upon sensing removal of said input control signal from said input trigger means in a sequential application and removal of said input control signal.

2. An apparatus as recited in claim 1, further comprising trigger/cycle select means for manually initiating said sequential activation of said valve driver means by said control processor means and for advancing said sequential activation.

3. An apparatus as recited in claim 1, further comprising pump driver means for generating a pump control signal to activate an irrigation pump, said pump driver means operatively responsive to said control processor means concurrent with activation of any one of said valve driver means.

4. An apparatus as recited in claim 3, further comprising timing control means for selecting a time period for activation of each of said valve driver means.

5. An apparatus as recited in claim 4, further comprising display means for providing visual indication of activation of said valve driver means.

6. An irrigation valve controller, comprising:
   (a) control processor means for sequentially activating a plurality of irrigation valves and for activating an irrigation pump;
   (b) a plurality of valve driver means for generating valve control signals to activate said irrigation valves, said valve driver means operatively responsive to said control processor means;
   (c) pump driver means for generating a pump control signal to activate an irrigation pump, said pump driver means operatively responsive to said control processor means, operation of said pump driver means being concurrent with operation of any of said valve driver means; and
   (d) input trigger means for sensing an input control signal from a station control line of a master controller and initiating said sequential activation of said valve driver means by said control processor means upon sensing removal of said input control signal from said input trigger means in a sequential application and removal of said input control signal.

7. An apparatus as recited in claim 6, further comprising trigger/cycle select means for manually initiating said sequential activation of said valve driver means by said control processor means and for advancing said sequential activation.

8. An apparatus as recited in claim 7, further comprising timing control means for selecting a time period for activation of each of said valve driver means.

9. An apparatus as recited in claim 8, further comprising a plurality of display means for providing visual indication of activation of said valve driver means.

10. An apparatus for providing a plurality of output signals suitable for activation of irrigation controls, comprising:
(a) a plurality of line drivers;
(b) a control processor, said control processor coupled to said line drivers, said control processor including means for sequentially activating at least two of said line drivers for a selected period of time, said control processor including means for activating at least one of said line drivers concurrent with activation of any of said other line drivers; and
(c) input trigger means for sensing an input control signal from a station control line of a master controller, said control processor including means for initiating activation of said line drivers upon sensing removal of said input control signal from said input trigger means in a sequential application and removal of said input control signal.

11. An apparatus as recited in claim 10, further comprising trigger/cycle select means for manually initiating said sequential activation of said line drivers by said control processor and for advancing said sequential activation.

12. An apparatus as recited in claim 11, further comprising timing control means for selecting a time period for activation of each of said line driver means.

13. An apparatus as recited in claim 12, further comprising a plurality of display means for providing visual indication of activation of said line drivers.

* * * * *